United States Patent
Duesler et al.

(10) Patent No.: US 6,222,359 B1
(45) Date of Patent: Apr. 24, 2001

(54) NON-CONTACTING POSITION SENSOR USING RADIAL BIPOLAR TAPERED MAGNETS

(75) Inventors: John S. Duesler, Buchanan, MI (US); Craig A. Jarrard, Middlebury, IN (US); Robert L. Newman, Osceola, IN (US); Ronald C. Nonnenmacher, Elkhart, IN (US); David S. Pfaffenberger, Mishawaka, IN (US); David J. Miller, Granger, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/335,546

(22) Filed: Jun. 18, 1999

(51) Int. Cl.[7] .................................................. G01B 7/30
(52) U.S. Cl. .......................... 324/207.12; 324/207.22; 324/207.2
(58) Field of Search .................. 324/207.12, 207.22, 324/207.2, 207.21, 207.24, 207.25; 330/32 R, 32 H

(56) References Cited

U.S. PATENT DOCUMENTS

| | | |
|---|---|---|
| 3,112,464 | 11/1963 | Ratajski . |
| 4,392,375 | 7/1983 | Eguchi . |
| 4,570,118 | 2/1986 | Tomczak . |
| 4,703,261 | 10/1987 | Berchtold . |
| 4,810,965 * | 3/1989 | Fujiwara et al. ............. 324/207.21 |
| 5,148,106 | 9/1992 | Ozawa . |
| 5,159,268 | 10/1992 | Wu . |
| 5,164,668 | 11/1992 | Alfors . |
| 5,191,284 | 3/1993 | Moretti . |
| 5,270,645 | 12/1993 | Wheeler . |
| 5,712,561 | 1/1998 | Mc Curley . |
| 5,757,179 | 5/1998 | McCurley . |

FOREIGN PATENT DOCUMENTS 990993    5/1965   (GB) .

* cited by examiner

*Primary Examiner*—Walter E. Snow
(74) *Attorney, Agent, or Firm*—Mark P. Bourgeois; Mark W. Borgman

(57) ABSTRACT

A non-contacting position sensor having radial bipolar tapered magnets. The sensor has a semicircular first plate and a second plate. Four semicircular magnets are affixed to the first plate and second plate. Each magnet has a thick end and a thin end. Two magnets generate a linearly varying magnetic field having a first polarity, while the other two magnets generate a linearly varying magnetic field having a second polarity. An air gap is formed in the space between the four magnets. A magnetic flux sensor is positioned within the air gap. The object whose position is to be monitored is rigidly attached to the magnet assembly, causing the magnetic flux sensor to move relative to the magnets within the air gap as the component moves. A varying magnetic field is detected by the magnetic flux sensor, resulting in an electrical signal from the magnetic flux sensor that varies according to its position relative to the four magnets.

15 Claims, 4 Drawing Sheets

NON-CONTACTING POSITION SENSOR USING RADIAL BIPOLAR TAPERED MAGNETS

CROSS REFERENCE TO RELATED APPLICATIONS

This application is related to U.S. patent application Ser. No. 09/208,296 filed Dec. 09, 1998 titled Non Contacting Position Sensor using Bi-polar Tapered Magnets and is herein incorporated by reference.

BACKGROUND OF THE INVENTION

I. Technical Field

This invention relates, in general, to non-contacting position sensors. More particularly, this invention relates to the magnetic configuration of non-contacting position sensors utilizing Hall effect devices, particularly those used in automotive environments.

II. Background Art

Electronic devices are an increasingly ubiquitous part of everyday life. Electronic devices and components are presently integrated in a large number of products, including products traditionally thought of as primarily mechanical in nature, such as automobiles. This trend is almost certain to continue. To successfully integrate electronic and mechanical components, some type of interface between the two technologies is required. Generally this interface is accomplished using devices such as sensors and actuators.

Position sensing is used to electronically monitor the position or movement of a mechanical component. The position sensor produces an electrical signal that varies as the position of the component in question varies. Electrical position sensors are an important part of innumerable products. For example, position sensors allow the status of various automotive parts to be monitored and controlled electronically.

A position sensor must be accurate, in that it must give an appropriate electrical signal based upon the position measured. If inaccurate, a position sensor will hinder the proper evaluation and control of the position of the component being monitored.

A position sensor must also be adequately precise in its measurement. The precision needed in measuring a position will obviously vary depending upon the particular circumstances of use. For some purposes only a rough indication of position is necessary, for instance, an indication of whether a valve is mostly open or mostly closed. In other applications more precise indication of position may be needed.

A position sensor must also be sufficiently durable for the environment in which it is placed. For example, a position sensor used on an automotive valve will experience almost constant movement while the automobile is in operation. Such a position sensor must be constructed of mechanical and electrical components which are assembled in such a manner as to allow it to remain sufficiently accurate and precise during its projected lifetime, despite considerable mechanical vibrations and thermal extremes and gradients.

In the past, position sensors were typically of the "contact" variety. A contacting position sensor requires physical contact between a signal generator and a sensing element to produce the electrical signal. Contacting position sensors typically consist of a potentiometer to produce electrical signals that vary as a function of the component's position. Contacting position sensors are generally accurate and precise. Unfortunately, the wear due to contact during movement of contacting position sensors has limited their durability. Also, the friction resulting from the contact can result in the sensor affecting the operation of the component. Further, water intrusion into a potentiometric sensor can disable the sensor.

One important advancement in sensor technology has been the development of non-contacting position sensors. As a general proposition, a non-contacting position sensor ("NPS") does not require physical contact between the signal generator and the sensing element. As presented here, an NPS utilizes magnets to generate magnetic fields that vary as a function of position and devices to detect varying magnetic fields to measure the position of the component to be monitored. Often, a Hall effect device is used to produce an electrical signal that is dependent upon the magnitude and polarity of the magnetic flux incident upon the device. The Hall effect device may be physically attached to the component to be monitored and move relative to the stationary magnets as the component moves. Conversely, the Hall effect device may be stationary with the magnets affixed to the component to be monitored. In either case, the position of the component to be monitored can be determined by the electrical signal produced by the Hall effect device.

The use of an NPS presents several distinct advantages over the use of the contacting position sensor. Because an NPS does not require physical contact between the signal generator and the sensing element, there is less physical wear during operation, resulting in greater durability of the sensor. The use of an NPS is also advantageous because the lack of any physical contact between the items being monitored and the sensor itself results in reduced drag upon the component by the sensor. Because the NPS does not rely upon an electrical contact, there is reduced susceptibility to electrical shorting caused by water intrusion.

While the use of an NPS presents several advantages, there are also several disadvantages that must be overcome in order for an NPS to be a satisfactory position sensor for many applications. Magnetic irregularities or imperfections may compromise the precision and accuracy of an NPS. The accuracy and precision of an NPS may also be affected by the numerous mechanical vibrations and perturbations likely be to experienced by the sensor. Because there is no physical contact between the item to be monitored and the sensor, it is possible for them to be knocked out of alignment by such vibrations and perturbations. A misalignment will result in the measured magnetic field at any particular location not being what it would be in the original alignment. Because the measured magnetic field will be different than that when properly aligned, the perceived position will be inaccurate. Linearity of magnetic field strength and the resulting signal is also a concern.

Some of these challenges to the use of an NPS have been addressed in existing devices, most notably the device of U.S. Pat. No. 5,712,561 issued to McCurley, et al and assigned to the CTS Corporation, herein incorporated by reference. There remains, however, a continuing need for a more precise determination of physical location of an item based upon the measured magnetic field at a location. Most particularly, a new type of non-contacting position sensor is needed which displays minimal deviations due to changes in temperature and maximum linearity of the magnetic field.

SUMMARY OF THE INVENTION

The present invention overcomes the limitations of the prior art to allow for greater accuracy and precision in a non-contacting position sensor. In particular, the present invention allows for synchronized deviations with temperature, thereby avoiding offset drift over temperature and for increased linearity over preexisting non-contacting position sensors. These advantages are accomplished by using an arrangement of radial bipolar tapered magnets to create a non-contacting position sensor with increased magnetic gain and decreased variations due to temperature changes. A non-contacting position sensor in accordance with the present invention displays improved linearity in response while being inexpensive and relatively simple to manufacture.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DESCRIPTION OF THE PREFERRED EMBODIMENT

Figure 1:
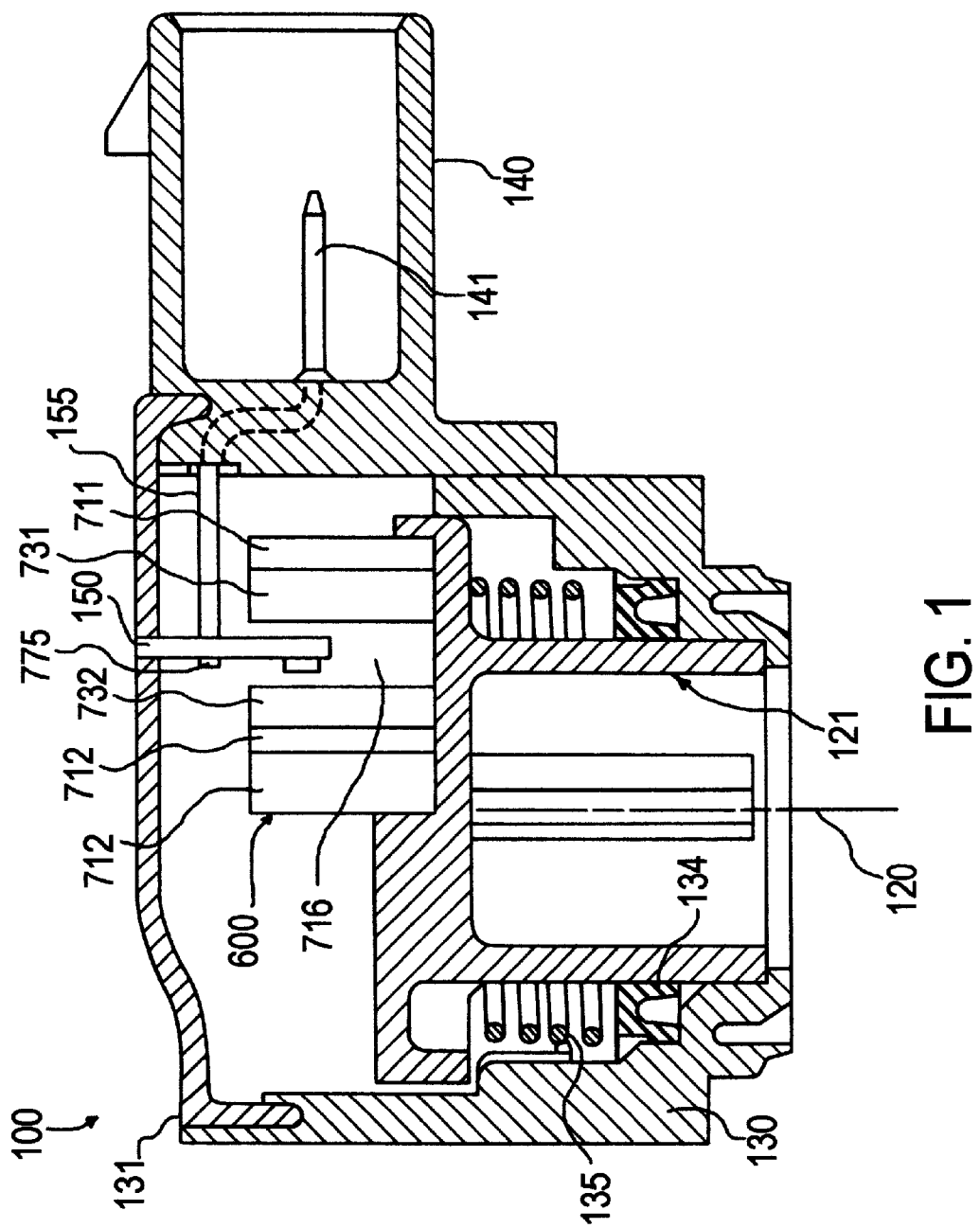
FIG. 1 is a cross sectional view of a position sensor using a radial bipolar tapered magnet.

FIG. 1 illustrates a non-contacting position sensor (NPS) using a radial bipolar tapered magnet. The NPS of the preferred embodiment is particularly adapted for use in monitoring the rotational position of a component, such as the shaft of a butterfly valve. Sensor 100 includes a housing 130 and a magnetic assembly 600. The magnetic assembly 600 includes a first plate 711, a second plate 712, and tapered magnets 731 and 732. Two additional tapered magnets are shown in subsequent figures. Magnetic assembly 600 is supported by a base 121. Magnets 731 and 732 are formed such that an air gap 716 is formed between and bordered by the magnets. As shall be described more fully below, the magnets create a magnetic field that varies in a substantially linear fashion. The plates 711 and 712 are preferably formed from sheets of magnetically permeable material such as stainless steel. Sensor 100 detects rotary motion about an axis 120. The rotor cup 121 is designed to engage a shaft extending from the component (not shown) whose position is to be monitored. The base or rotor cup 121 therefore rotates as the shaft and component rotate. Magnet assembly 600 is rigidly affixed to the rotor cup 121 and rotates as well. The rotor cup 121 may be retained in position using the housing 130, spring 135, and cover 131. Magnetic assembly 600 is semicircular shaped and rotates about axis 120. Within the air gap 716 formed between the magnets is a magnetic flux sensor, such as a Hall effect device 775. The Hall effect device 775 is carried upon a hybrid circuit substrate or printed circuit board 150. The Hall effect device 775 should preferably be positioned toward the center of the air gap 716 to avoid any edge irregularities in the magnetic field created by the magnets. The Hall effect device 775 and hybrid circuit substrate 150 are stationary while the magnets rotate about the axis 120. The hybrid circuit substrate 150 may be attached to the housing 130 using heat staking or similar methods. The circuit substrate 150 is electrically connected to electrical terminals 141 via wires 155. The electrical terminals 141 are located in a connector 140, which allows for interconnection with a standard mating connector. As the magnetic field generated by the magnets and detected by the Hall effect device varies with rotation, the signal produced by the Hall effect device 775 changes accordingly, allowing the position of the component to be monitored to be ascertained.

The assembly of sensor 100 is improved over prior techniques because of the orientation of magnet assembly 600. During assembly, circuit board 150 can be directly inserted into air gap 716 without having to rotate the spring loaded rotor cup 121. This provides for an assembly which is more easily automated.

Figure 2:
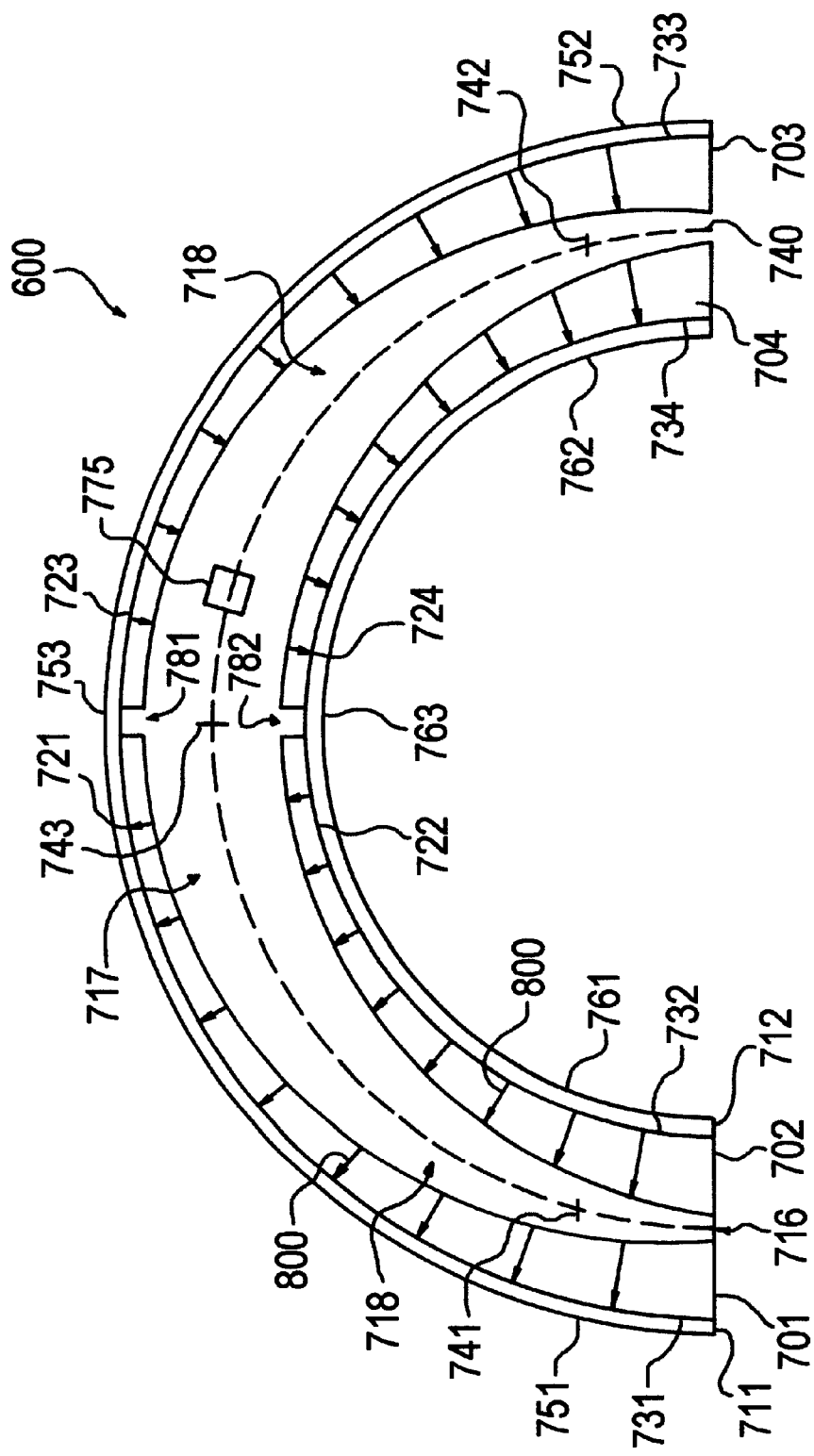
FIG. 2 illustrates a top view of a magnet assembly and pole piece in accordance with the preferred embodiment of the present invention.
Figure 3:
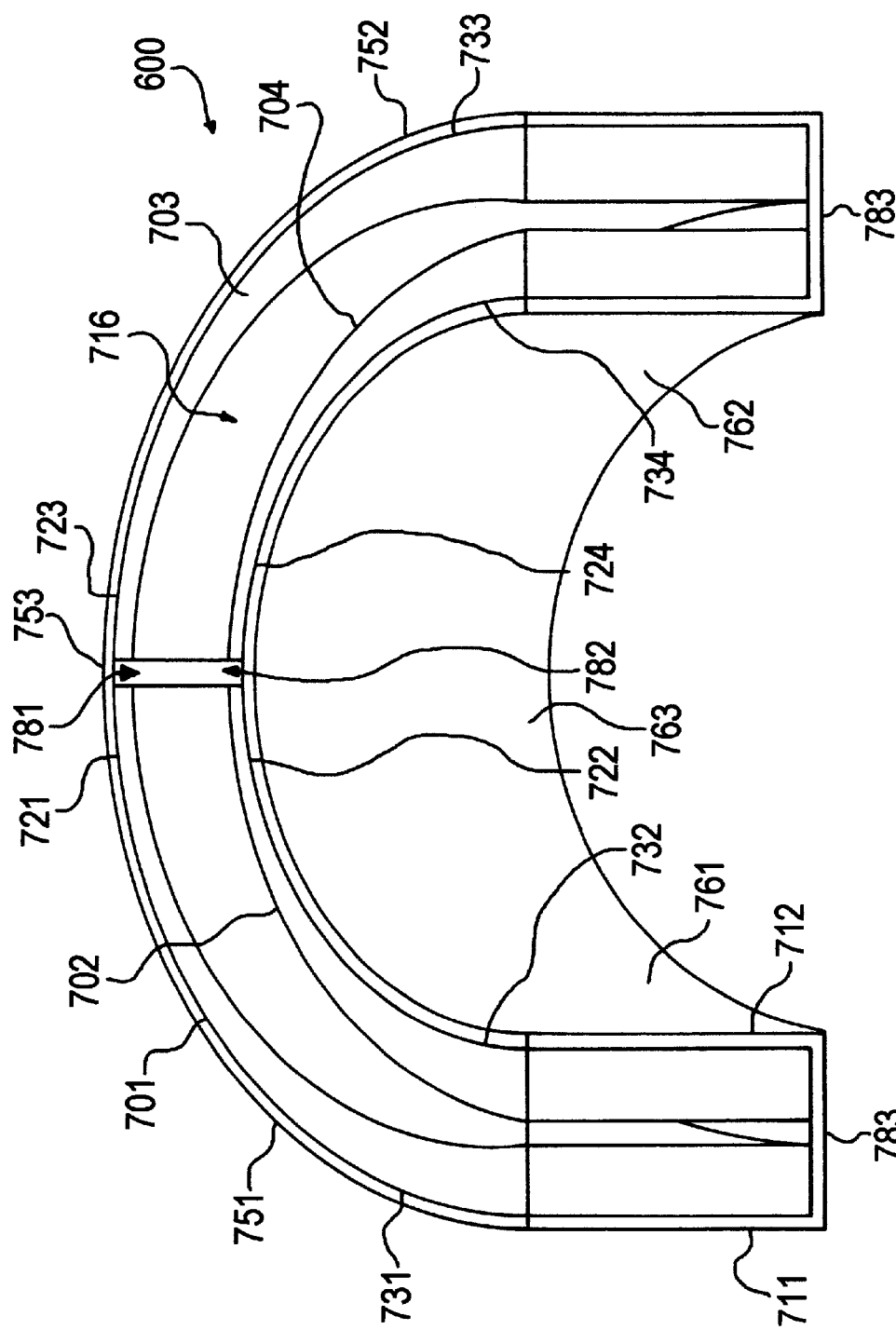
FIG. 3 illustrates an isometric view of the magnet assembly from FIG. 2.

FIGS. 2 and 3 illustrate the magnet assembly 600 and pole pieces. A semicircular first plate 711 is affixed to the top of the magnet assembly. A semicircular second plate 712 is affixed to the bottom of the magnet assembly. Plate 711 has a greater radius than does plate 712. Plates 711 and 712 define pole pieces. Plates 711 and 712 are preferably magnetically permeable, and may be injection molded to the respective magnet portions. Plate 711 has a first end 751, a second end 752 and a middle 753. Likewise, the second plate 712 has a first end 761, a second end 762 and a middle 763. A third plate or backstrap 783 is connected between plates 711 and 712. Third plate 783 connects and holds the plates 711 and 712 spaced apart form each other. Plates 711 and 712 intensify the magnetic flux produced by the magnets.

Magnet assembly 600 has four semicircular tapered magnet regions or portions 701, 702, 703, and 704. The first magnet 701 has a thin end 721 and a thick end 731. The second magnet 702 has a thin end 722 and a thick end 732. The third magnet 703 has a thin end 723 and a thick end 733. The fourth magnet 704 has a thin end 724 and a thick end 734. The four tapered magnet regions are all formed of bonded ferrite or other magnetic material. Alternatively, the four tapered magnet portions may be constructed as two separate magnets, each having two portions. In this alternative, magnet portions 701 and 703 could comprise portions of one magnet, while magnet portions 702 and 704 could comprise portions of another magnet. The four tapered magnets 701, 702, 703, and 704 are magnetized in a radial direction such that magnets 701 and 702 have opposite polarities than magnets 703 and 704 respectively.

A first magnet gap 781 separates thin end 721 of first magnet 701 from the thin end 723 of the third magnet 703. A second magnet gap 782 separates the thin end 722 of the second magnet 702 from thin end 724 of fourth magnet 704. The first magnet 701 is affixed to the first plate 711 such that thin end 721 is proximate to the middle 753 of the first plate 711, while the thick end 731 is proximate to the first end 751 of the first plate 701. The first magnet 701 produces a varying magnetic flux field as indicated by vectors 800. The polarity of the magnetic field generated by the first magnet 701 is indicated by the upward direction of the vectors 800. The polarity of the magnetic field generated by first magnet 701 is denoted the first polarity and defined as positive. Likewise, the strength of the magnetic flux field is indicated by the length of the vectors. As can be seen in FIG. 2, the magnetic flux field generated by the first magnet 701 decreases in strength from the thick end 731 to the thin end 721. Magnets 702, 703 and 704 are similarly designed as illustrated. The third magnet 703 and first magnet 701 may be described as linearly or symmetrically adjacent, or simply adjacent. Likewise, the second magnet region 702 and the fourth magnet 704 may be described as linearly or symmetrically adjacent, or simply adjacent.

A first magnet gap 781 separates thin end 721 of the first magnet 701 from thin end 723 of third magnet 703. Similarly, a second magnet gap 782 separates the thin end 722 of second magnet 702 from the thin end 724 of fourth magnet 704. While the magnet gaps 781 and 782 may be omitted without departing from the scope of the present invention, they serve important functions. Magnet gaps 781 and 782 increase the linearity of the magnetic field within airgap 716. As a practical matter, the thin end of a magnet will always have a finite thickness and generate a non-zero magnetic field. If the thin ends of two magnets having opposite polarities are immediately adjacent, there will be a discontinuity of the combined magnetic field about the symmetry point 740. By providing a gap between adjacent thin ends of the tapered magnets, this discontinuity and other problems affecting linearity of sensor output may be avoided. Further, the gaps allow for a consistent neutral zone, at around point 743, independent of magnetizing property variations, which aids linearity of sensor output. The magnet gaps 781 and 782 may be created during the molding of the magnets. If the magnets are formed individually, the gaps may be formed by appropriately positioning individual magnets. Alternatively, magnetic material may be removed to create the gaps after the magnets have been formed.

The air gap 716 is formed between the magnets. As can be seen in FIG. 2, the air gap 716 is essentially U-shaped, with the central portion of the air gap 717 being larger than both ends 718 of air gap 716. A magnetic flux sensor such as a Hall effect device 775 is positioned within the air gap 716. The relative movement between the Hall effect device 775 and the magnetic assembly causes the position of the Hall effect device 775 within the air gap 716 to vary along line 740. The magnetic field within the air gap 716 is the sum of the magnetic fields generated by the magnet regions 701, 702, 703 and 704. The polarity and strength of the combined magnetic field varies along the line 740. As a magnetic field of the first polarity, such as that generated by the first magnet 701 and the second magnet 702, is defined as positive and a magnetic field of the second polarity, such as that generated by the third magnet 703 and the fourth magnet 704, is defined as negative, the magnetic field detected by the Hall effect device 775 as it moves along the line 740 will be large and positive at the first end 741 of the air gap and decrease substantially linearly as it approaches the middle 743 of the air gap, at which point the magnetic field will be substantially zero. As the Hall effect device 775 travels along the line 740 from the middle 743 to the second end 742 of the air gap 716 the polarity of the magnetic field detected will be negative but of a substantially linearly increasing magnitude.

Figure 4:
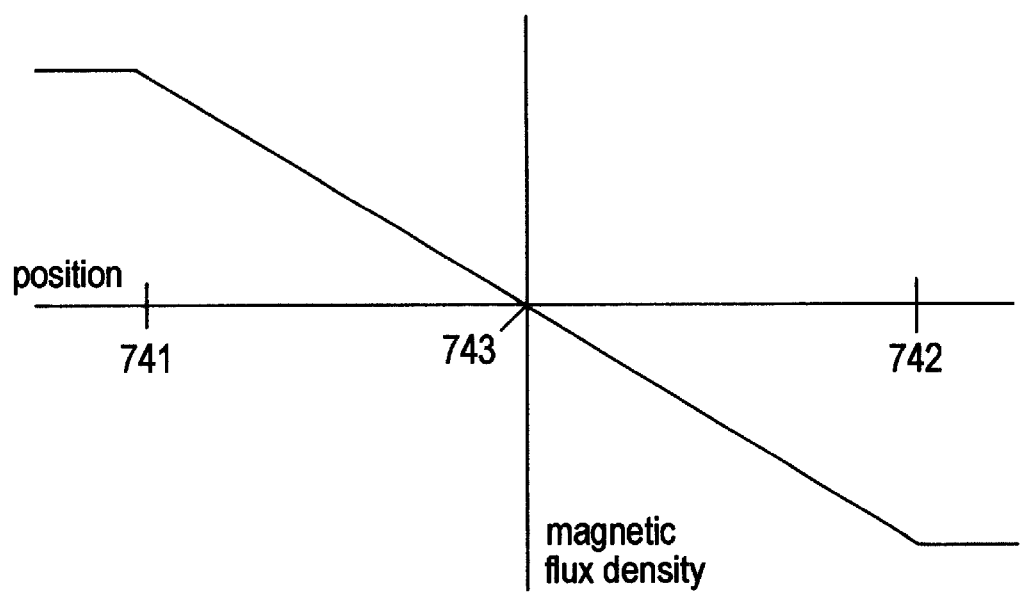
FIG. 4 illustrates magnetic flux density in the present invention as a function of the component position.

This variance of magnetic field polarity and strength as a function of a linear position is illustrated in FIG. 4. FIG. 4 is a graph in which the x axis denotes the position of the Hall effect device 775 along line 740 and the y axis illustrates the magnetic flux density detected by the Hall effect device 775. As can be seen, the magnetic flux density measured by the Hall effect device 775 at position 741 is high and positive. The magnetic flux density measured at position 742 is of approximately the same magnitude as at position 741 but of opposite polarity, and is denoted as negative. The measured magnetic flux density is substantially linear between position 741 and position 742, with the point of substantially zero magnetic flux density being located at position 743, the symmetry point on the x-axis, located midway between positions 741 and 742. The use of four magnet regions in the present invention allows for the creation of relatively strong magnetic fields and accordingly increased linearity of the magnetic field within the air gap 716. The signal produced by the Hall effect device 775 is proportional to the magnetic flux density it measures within the air gap 716. Accordingly, the increased linearity of a magnetic field within the air gap 716 results in an increased linearity of output of the Hall device 775 and increased accuracy and precision of position readings. The bipolar polarity directions could be reversed, if desired, resulting in a signal of opposite slope.

The present invention may be readily adapted for use in measuring rotations of three hundred and sixty degrees or more. This adaptation may be accomplished by modifying the magnets and plates to be fully circular. The thick ends of the magnetic portions will then be positioned essentially one hundred and eighty degrees from the thin ends of the magnetic portions. A magnetic gap may be provided between the thin ends of the first and third magnets and between the thin ends of the second and fourth magnets. Alternatively, the thick ends of the first and third magnetic portions and of the second and fourth magnetic portions may abut one another.

The position sensor 100 has improved linearity of magnetic field and the resulting signal as well as decreased signal variance due to temperature changes. This results from the rotation of the linear output of the magnets, between points 741 and 742, to rotate about substantially zero Gauss, point 743, due to temperature. Relative to temperature, the zero gauss point is the approximate point of rotation in sensitivity of the hall effect device. The sensitivity of the field sensing device also rotates about zero Gauss point. This improves the ability of the sensor to compensate for temperature changes by eliminating previously needed circuitry and additional processing complexities. In its broader aspects, the invention may be viewed as a magnetic circuit comprising: 1) four tapered magnet regions which generate a magnetic field; 2) an air gap and pole piece that are permeated by the magnetic field; and 3) a magnetic flux sensor which produces a voltage proportionate to the magnetic field at its location. A non-contacting position sensor in accordance with the present invention may be affixed to the component to be monitored in any appropriate fashion.

It is to be appreciated that numerous variations from the example embodiments described herein may be made without parting from the scope of the invention. It is noted that a wide variety of materials may be used to construct the magnets and the plates. The magnets themselves may be individual magnets, or may be magnetic portions of larger magnets. The magnet gaps between the thin ends of adjacent magnets or magnet regions may be formed in any of a variety of ways. The magnet assembly may be substantially pie shaped, circular, linear or may be any of a number of other shapes. While the magnet assembly preferably includes magnetically permeable plates, the plates are not required. Plate 783 may be omitted. The precise type of apparatus the position sensor is attached to is immaterial to the present invention. Likewise, the particular type and variety of magnetic flux sensor used in connection with a non-contacting position sensor in accordance with the present invention is immaterial. A variety of mechanisms may be used to connect the magnet assembly to the component to be monitored in addition to the rotor cup. Alternatively, the Hall effect device could be connected to the component to be monitored, with the magnet assembly remaining substantially stationary. The electrical connections and the methods of establishing them may vary from those shown in accordance with the preferred embodiment. One skilled in the art will likewise readily ascertain numerous other variations that may easily be made without departing from the spirit and scope of the present invention.

What is claimed is:

1. A sensor for sensing movement of an attached movable object, comprising:
   a) a U shaped air gap, having a central air gap portion that is larger than both ends of the air gap;
   b) a magnetic flux sensor positioned in the air gap;
   c) a first and second magnet positioned on opposite sides of the air gap, each having a central portion that is thinner than both ends of the first and second magnets, wherein the central portion is co-extensive with the central air gap portion, the first and second magnets each has a first polarity on one side of the central portion and a substantially opposite second polarity on the other side of the central portion; and
   d) the first and second magnets each having a magnet gap in the central portions.

2. The sensor of claim 1, further comprising:
   a) a magnetically permeable first plate affixed to the first magnet; and
   b) a magnetically permeable second plate affixed to the second magnet.

3. The sensor of claim 2, further comprising:
   a) a magnetically permeable third plate affixed between the first plate and the second plate.

4. The sensor of claim 1, wherein the magnetic flux sensor comprises a Hall effect device.

5. The sensor of claim 1, wherein first and second magnets are rigidly affixed to the movable object, such that when the object moves, the first and second magnets move relative to the magnetic flux sensor.

6. The sensor of claim 1, wherein the magnets have a semicircular shape.

7. The sensor of claim, 1 wherein the magnetic flux sensor is rigidly affixed to the movable object, such that when the object moves the magnetic flux sensor moves relative to the first and second magnets.

8. The sensor of claim 1, wherein the sensor measures rotational motion through 180 degrees.

9. A non-contacting position sensor comprising:
   a) an air gap having a first end, a second end, and a middle;
   b) a Hall effect device movably positioned within the air gap;
   c) four magnetically polarized magnet portions positioned within the air gap each comprising:
      c1) a thick end;
      c2) a thin end;
      c3) wherein the thickness of each magnet portion increases substantially linearly from the thin end to the thick end;
      c4) wherein two magnet portions have a first polarity and extend from the first end of the airgap to the middle of the airgap, and wherein two magnet portions have a second polarity substantially opposite the first polarity and extend from the second end of the air gap to the middle of the airgap; and
      c5) a magnet gap located on opposite sides of the middle of the air gap.

10. The sensor of claim 9, further comprising a pole piece to carry the four magnetic portions, the pole piece being constructed of a magnetically permeable material.

11. The sensor of claim 9, wherein the Hall effect device is rigidly affixed to a component whose position is to be monitored, such that when the component moves the Hall effect device moves relative to the pole piece.

12. The sensor of claim 9 wherein the pole piece is rigidly affixed to a component whose position is to be monitored, such that when the component moves the pole piece moves relative to the Hall effect device.

13. The sensor of claim 9, wherein the sensor measures rotational motion through 180 degrees.

14. A non-contacting position sensor, comprising:
   a) an air gap having a central air gap portion that is larger than both ends of the air gap;
   b) a first tapered magnet region having a thin portion co-extensive with the central air gap portion;
   c) a second tapered magnet region adjacent to the first tapered magnet region, the second tapered magnet region having a thin portion co-extensive with the central air gap portion, the first and second magnets generating a magnetic flux;
   d) a u-shaped plate affixed to the first and second tapered magnet regions; and
   e) a sensor disposed in the air gap and operable to provide an electrical output signal that is proportional to the density of the magnetic flux; and
   f) a magnet gap located between the thin portions of the first and second tapered magnet regions.

15. The non-contacting position sensor of claim 14, wherein the magnet gap increases the linearity of magnetic flux in the air gap.

* * * * *